United States Patent
Ng et al.

[11] Patent Number: 5,107,349
[45] Date of Patent: Apr. 21, 1992

[54] MULTIPLE SCREEN FREQUENCY HALF-TONING WITH ONE SCREEN ANGLE

[75] Inventors: Yee S. Ng, Fairport; Hwai-Tzuu Tai, Rochester; Eric K. Zeise, Pittsford, all of N.Y.

[73] Assignee: Eastman Kodak Company, Rochester, N.Y.

[21] Appl. No.: 509,130

[22] Filed: Apr. 16, 1990

[51] Int. Cl.⁵ .............................. H04N 1/21
[52] U.S. Cl. .................... 358/457; 358/461
[58] Field of Search .............. 358/456, 457, 466

[56] References Cited

U.S. PATENT DOCUMENTS

| | | | |
|---|---|---|---|
| 4,517,605 | 5/1985 | Yokomizo | 358/283 |
| 4,553,173 | 11/1985 | Kawamura | 358/283 |
| 4,651,228 | 3/1987 | Koch | 358/456 |

*Primary Examiner*—Leo H. Boudreau
*Assistant Examiner*—Barry Stellrecht
*Attorney, Agent, or Firm*—Milton S. Sales

[57] ABSTRACT

A halftone threshold value supermatrix produces different screen frequencies between density steps, but at the same screen angle so as to provide image processing for rendering halftone images with an increased number of gray level steps without changing the apparent screen angle between density steps. A gray level pixel value is compared to a threshold value to make a print or no print decision. The threshold value may come from a $j \times k$ threshold value supermatrix divided into four equal submatrices of elements such that there is one more ON element in one of the submatrices than in the other three when there are an odd number of ON elements and there are the same number of ON elements in each of the submatrices when there are an even number of ON elements in the supermatrix.

8 Claims, 5 Drawing Sheets

|    |    |   |    |
|----|----|---|----|
| 25 | 17 | 9 | 27 |
| 31 | 1  | 3 | 19 |
| 15 | 7  | 5 | 11 |
| 23 | 13 | 21| 29 |

FIG. 4A

|    |    |    |    |
|----|----|----|----|
| 26 | 18 | 10 | 28 |
| 32 | 2  | 4  | 20 |
| 16 | 8  | 6  | 12 |
| 24 | 14 | 22 | 30 |

FIG. 4B

|    |    |    |    |    |    |    |    |
|----|----|----|----|----|----|----|----|
| 25 | 17 | 9  | 27 | 26 | 18 | 10 | 28 |
| 31 | 1  | 3  | 19 | 32 | 2  | 4  | 20 |
| 15 | 7  | 5  | 11 | 16 | 8  | 6  | 12 |
| 23 | 13 | 21 | 29 | 24 | 14 | 22 | 30 |
| 26 | 18 | 10 | 28 | 25 | 17 | 9  | 27 |
| 32 | 2  | 4  | 20 | 31 | 1  | 3  | 19 |
| 16 | 8  | 6  | 12 | 15 | 7  | 5  | 11 |
| 24 | 14 | 22 | 30 | 23 | 13 | 21 | 29 |

| 25 | 17 | 9  | 27 | 26 | 18 | 10 | 28 |
|----|----|----|----|----|----|----|----|
| 31 | 1  | 3  | 19 | 32 | 2  | 4  | 20 |
| 15 | 7  | 5  | 11 | 16 | 8  | 6  | 12 |
| 23 | 13 | 21 | 29 | 24 | 14 | 22 | 30 |
| 26 | 18 | 10 | 28 | 26 | 18 | 10 | 28 |
| 32 | 2  | 4  | 20 | 32 | 2  | 4  | 20 |
| 16 | 8  | 6  | 12 | 16 | 8  | 6  | 12 |
| 24 | 14 | 22 | 30 | 24 | 14 | 22 | 30 |

| a | b | a | b |
|---|---|---|---|
| b | b | b | b |
| a | b | a | b |
| b | b | b | b |

FIG. 10

| 1 |   | 1 |   |
|---|---|---|---|
|   |   |   |   |
| 1 |   | 1 |   |
|   |   |   |   |

FIG. 11

| 1 | 2 | 1 | 2 |
|---|---|---|---|
| 2 | 2 | 2 | 2 |
| 1 | 2 | 1 | 2 |
| 2 | 2 | 2 | 2 |

MULTIPLE SCREEN FREQUENCY HALF-TONING WITH ONE SCREEN ANGLE

BACKGROUND OF THE INVENTION

1. Technical Field

This invention relates generally to encoding pictorial imagery for halftone reproduction on binary display devices.

2. Background Art

As an approximation to continuous tone images, pictorial imagery is represented via a halftone image processing apparatus and process in which each input pixel is translated into a j×k pattern of recorded elements, where j and k are positive integers. A halftone image is reproduced by printing the respective elements or leaving them blank. That is, by suitably distributing the recorded elements.

Image processing apparatus and processes are evaluated in part, by their capability of delivering a complete gray scale at normal viewing distances. The capability of a particular process to reproduce high frequency renditions (fine detail) with high contrast modulation makes that procedure superior to one which reproduces such fine detail with lesser or no output contrast.

Another measure of image processing apparatus and process merit is the tendency to produce visual artifacts in the output image that are not part of the original image, but are the result of the image processing, including moire patterns, false contours, and false textures. Moire patterns are false details created most often by the beating between two relatively high frequency processes resulting in a signal whose spacial frequency is low enough to be seen by the viewer. False contours are the result of gray scale quantization steps which are sufficiently large to create a visible contour when the input image is truly a smooth, gradual variation from one to the other. False textures are artificial changes in the image texture which occur when input gray levels vary slowly and smoothly and the output generates an artificial boundary between the textural patterns for one gray level and the textural patterns for the next gray level.

FIG. 1 shows a schematic view of the electronic screening process. Signal $X_i$ represents the lightness or gray level information at a sampling point "i" of an image. Input signal $X_i$ of sample image pixels is compared with a series of threshold values $C_i$ selected in sequential order from a two-dimensional threshold value matrix, and a print/no-print decision is made. The series of threshold values and their arrangement within the threshold value matrix determine the gray scale range, frequency, angle, and other properties of the halftone pictorial image. By comparing the input signal $X_i$ with the threshold levels, j×k output signals $O_i$ are produced. A density pattern consisting of a combination of j×k elements is obtained by dividing each pixel into j×k elements and systematically printing them or leaving them blank. When the input signal $X_i$ exceeds the selected threshold value $C_i$, the corresponding element is determined to have a print level (logic level "ONE"). FIG. 2 is a 4×4 threshold value matrix in which sixteen gray levels (plus all white) are obtained by sequentially increasing the number of elements which are printed, as shown in FIG. 3.

A problem exists with the number of density levels attainable with a limited resolution and acceptable screen frequency. One way to get more gray levels is to reduce the number of lines per inch and adoption of larger matrix dimensions, but this decreases the resolution and decreases the screen frequency to a visible level.

One known attempt to improve both gradation and resolution is the adoption of a small matrix for the resolution unit, and the adoption of a large matrix for the gradation unit, for example the so called "Improved Halftone" (IH) method. In the IH method, an 8×8 superthreshold value matrix is divided into four 4×4 submatrices. Having the same threshold value in the diagonal direction, sixteen density levels are output. FIGS. 4(a) and 4(b) show two 4×4 threshold value submatrices, and FIG. 5 shows an IH supermatrix formed of four submatrices, which are in turn each formed of four elements. FIG. 6 is a group of four adjacent supermatrices where submatrices according to FIG. 4(a) are labeled "a" and submatrices according to FIG. 4(b) are labeled "b".

When there are an odd number of elements turned ON, there is one more element in submatrices "a" than in submatrices "b". As shown in FIG. 7, this results in a 45° apparent screen angle at a screen frequency having a $4(2)^{\frac{1}{2}}$ element period. On the otherhand, an even number of elements turned ON, as shown in FIG. 8, results in a 90° apparent screen angle at a screen frequency having a 4 element period.

While the IH method for determining a density level increases the number of available gray levels by printing the image at a higher screen frequency, there will be an increase in false texture artifacts (artificial changes in the image texture which occur when input gray levels vary slowly and smoothly and the output generates an artificial boundary between the textural patterns for one gray level and the textural patterns for the next gray level) at any image portion where the number of black elements is small. This is due to the IH method producing a change in apparent screen angles between density steps.

DISCLOSURE OF INVENTION

It has been found that by arranging the submatrices in a novel orientation within a supermatrix, the increased number of gray level advantage of IH can be retained while avoiding the false texturing problem associated with changing screen angles between density steps.

It is therefore an object of the present invention to provide a halftone threshold value supermatrix which produces different screen frequencies between density steps, but at the same screen angle.

It is another object of the present invention to provide image processing for rendering halftone images with an increased number of gray level steps without changing the apparent screen angle between density steps.

In accordance with a feature of the present invention, a system for reproducing a gray level image in a bi-tonal medium comprises means for comparing a gray level pixel value with a threshold value to make a print or no print decision. The threshold value is determined in accordance with a pattern of threshold values selected to produce different screen frequencies between density steps at the same screen angle. The threshold value may come from a j×k threshold value supermatrix divided into four equal submatrices of elements such that there is one more ON element in one of the submatrices than in the other three when there are an odd number of ON elements and there are the same number of ON elements in each of the submatrices when there are an even number of ON elements in the supermatrix.

A halftone electronic screening image processing apparatus according to a preferred embodiment of the present invention includes a plurality of at least two different types of threshold value halftone submatrices of j×k elements arranged in a supermatrix, wherein each of the elements is assigned different screen signal values representative of gray levels. Means are provided for selecting a series of threshold values in sequential order from the supermatrix. The series of threshold values are compared with an electrical signal representative of the gray level of an image pixel for generating an output marking signal corresponding to one or the other of two levels in a binary graphic or display device. The halftone supermatrix is defined such that there is one more ON element in one of the submatrix types than in the other submatrix type when there are an odd number of elements turned ON so as to result in a predetermined apparent screen angle at a first screen frequency, and there is the same number of ON elements in all submatrices so as to result in a predetermined apparent screen angle at a second screen frequency different from the first screen frequency when there are an even number of elements turned ON. Thus, the electronic halftone threshold value supermatrix formed of the submatrices increases the number of available gray levels by printing the image at a higher screen frequency without increasing in false texture artifacts because the apparent screen angle does not change between density steps.

BRIEF DESCRIPTION OF THE DRAWINGS

In the detailed description of the preferred embodiments of the invention presented below, reference is made to the accompanying drawings, in which:

FIGS. 4(a) and 4(b) are 4×4 electronic halftone threshold value submatrices known in the prior art;

FIG. 5 is an 8×8 electronic IH threshold value supermatrix formed of the submatrices of FIGS. 4(a) and 4(b);

Figures 6, 7, 8:
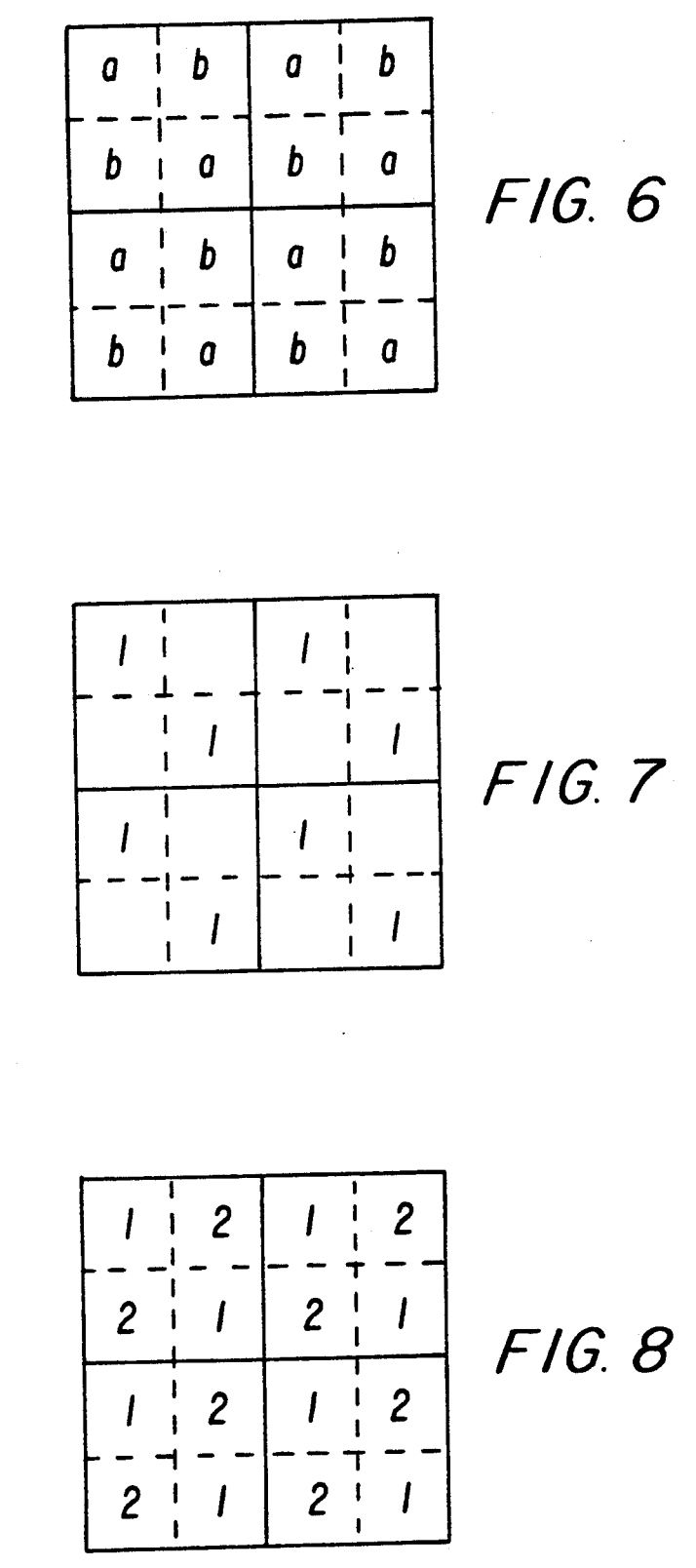

FIG. 6 is a group of four adjacent supermatrices of FIG. 5;

FIG. 7 is a view of one screen angle resulting from the groups of supermatrices of FIG. 6;

FIG. 8 is a view of another screen angle resulting from the groups of supermatrices of FIG. 6;

FIG. 9 is an 8×8 electronic halftone threshold value supermatrix formed of the submatrices of FIGS. 4(a) and 4(b) arranged according to the present invention;

FIG. 10 is a group of four adjacent supermatrices of FIG. 9;

FIG. 11 is a view of one screen angle resulting from the groups of supermatrices of FIG. 10;

FIG. 12 is a view of another screen angle resulting from the groups of supermatrices of FIG. 10; and FIG. 13 is an electronic halftone threshold value supermatrix formed of the submatrices arranged according to another embodiment of the present invention.

BEST MODE FOR CARRYING OUT THE INVENTION

Figure 1:
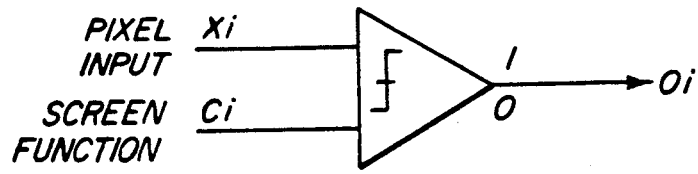
FIG. 1 is a schematic view of the electronic screening process known in the prior art.
Figure 2:
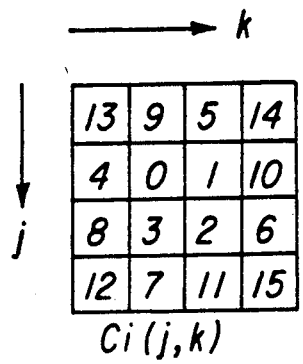
FIG. 2 is a 4×4 electronic halftone threshold value matrix known in the prior art.
Figure 3:
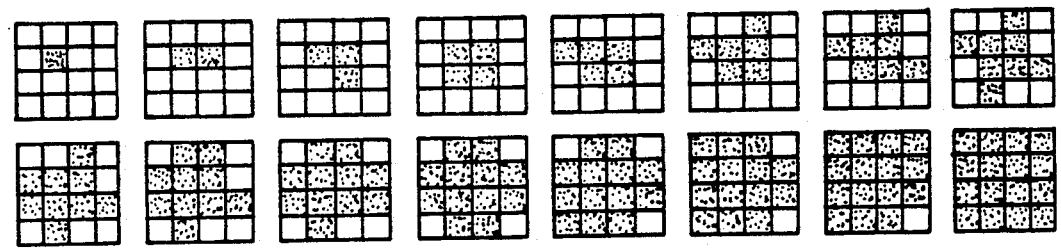
FIG. 3 is a view of the possible halftone patterns of the matrix of FIG. 2.

The present description will be directed in particular to elements forming part of, or cooperating more directly with, apparatus in accordance with the present invention. It is to be understood that elements not specifically shown or described may take various forms well known to those skilled in the art.

It has been found that by arranging the submatrices differently in a supermatrix, the advantage which IH processing has over other halftone image processing algorithms (including an increased number of gray levels) can be retained while avoiding the false texturing problem associated with changing screen angles between density steps.

FIG. 9 is an 8×8 electronic halftone threshold value supermatrix formed of the submatrices of FIGS. 4(a) and 4(b) arranged in a novel way according to the present invention. FIG. 10 is a group of four adjacent supermatrices where submatrices according to FIG. 4(a) are labeled "a" and submatrices according to FIG. 4(b) are labeled "b".

When there are an odd number of elements turned ON, there is one more element in submatrices "a" than in submatrices "b". As shown in FIG. 11, this results in a 90° apparent screen angle at a screen frequency having an eight element period. On the otherhand, an even number of elements turned ON, as shown in FIG. 12, results in a 90° apparent screen angle at a screen frequency having a four element period.

Thus, the electronic halftone threshold value supermatrix formed of the submatrices arranged according to the present invention increases the number of available gray levels by printing the image at a higher screen frequency without increasing in false texture artifacts because the apparent screen angle does not change between density steps.

Figure 13:
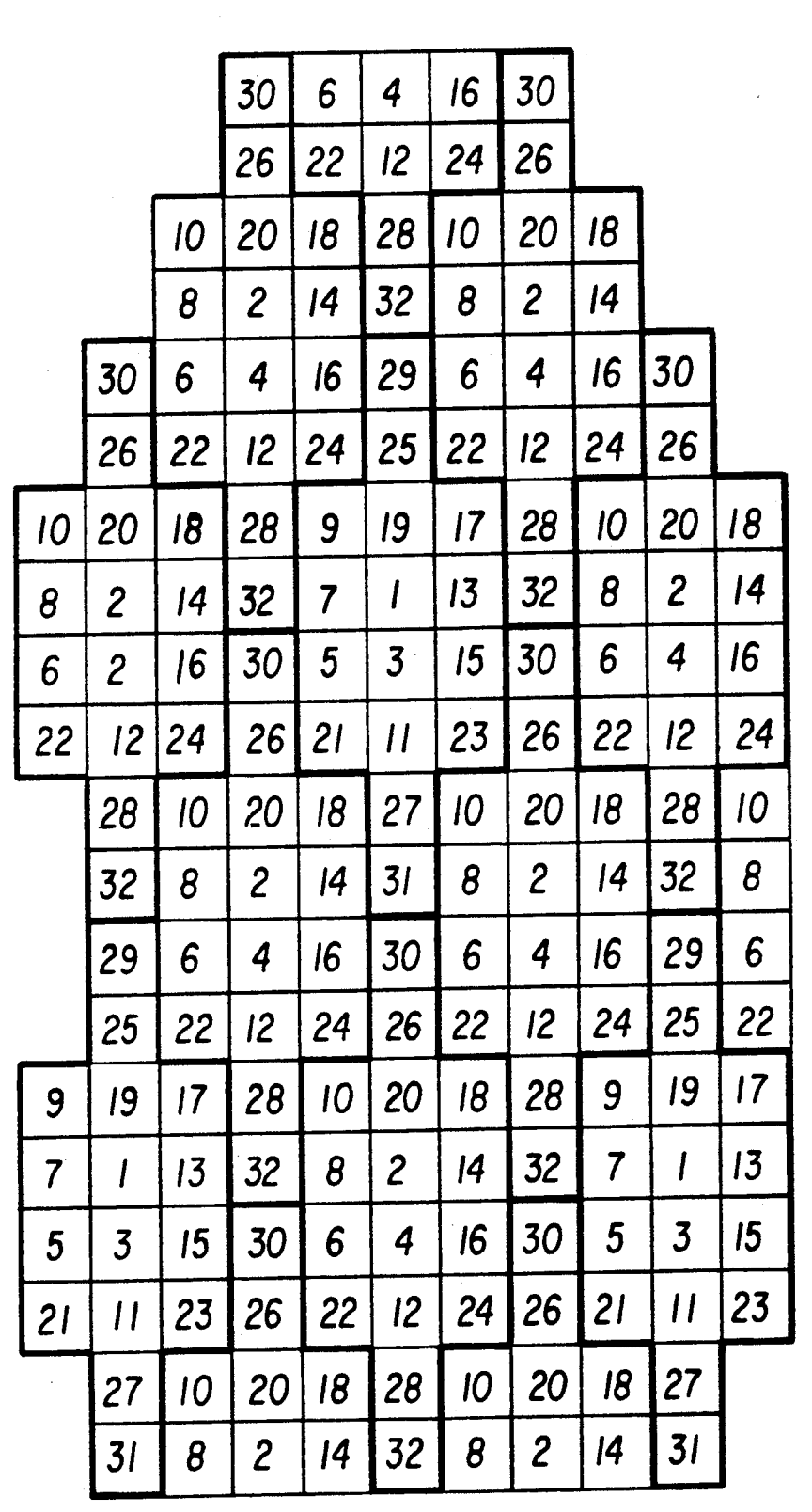

The present invention can be applied to matrices having 45° screen angles, or any other angle. For example, FIG. 13 is a screen with thirty-three gray levels, resulting in multiple screen frequencies at a constant 45° screen angle.

The invention has been described in detail with particular reference to preferred embodiments thereof, but it will be understood that variations and modifications can be effected within the spirit and scope of the invention.

What is claimed is:

1. A halftone electronic screening image processing method comprising:

providing a plurality of two different types of threshold value halftone submatrices of j×k elements arranged in a supermatrix;

assigning different screen signal values representative of gray levels to each of said elements in the two types of submatrices;

creating a series of threshold values selected in sequential order from said supermatrix;

comparing the series of threshold values with an electrical signal representative of the gray level of an image pixel for generating an output marking signal corresponding to one or the other of two levels in a binary graphic or display device; and defining said halftone supermatrix such that:

(a) when there are an odd number of elements turned ON in a supermatrix, there is one more ON element in one of said submatrix types than in the other submatrix type, and this results in a predetermined apparent screen angle at first screen frequency, and (b) when there are an even number of elements turned ON in a supermatrix, there is the same number of ON elements in both submatrix types, and this results in said predetermined apparent screen angle at a second screen frequency different from said first screen frequency, whereby the electronic halftone threshold value supermatrix formed of the submatrices increases the number of available gray levels by printing the image at a higher screen frequency without increasing in false texture artifacts because the apparent screen angle does not change between gray levels.

2. A halftone electronic screening image processing method as set forth in claim 1 wherein said supermatrix comprises four submatrices.

3. A system for reproducing a gray level image in a bi-tonal medium, comprising:
    comparison means for comparing a gray level pixel value with a matrix of threshold values to make a print or no print decision;
    matrix means for transmitting said matrix of threshold values to said comparison means, said matrix means including means for determining said threshold values so as to produce different screen frequencies between gray levels at the same screen angle.

4. A system as set forth in claim 3 wherein said matrix means comprises an j×k threshold value supermatrix divided into four equal submatrices of elements such that there is one more ON element in one of said submatrices than in the other three when there are an odd number of ON elements and there are the same number of ON elements in each of said submatrices when there are an even number of ON elements in the supermatrix.

5. An image signal processing apparatus comprising binary signal generating means for providing binary signals of received image density signals, said binary signal generating means including converter means for performing conversion of said image density signals to gray levels by using a supermatrix divided into plural submatrices wherein parameters of said submatrices are set in such a manner that the spacial frequency of the pattern of the supermatrix changes between gray levels and the apparent screen angle does not change between gray levels.

6. An image signal processing apparatus as set forth in claim 5 wherein there are at least two mutually different types of said submatrices each of which is composed of plural threshold values so arranged as to constitute a pattern of threshold values alternately progressively expanding between increasing gray levels.

7. An image signal processing apparatus as set forth in claim 6 wherein said supermatrix comprises one submatrix of one of said types and three submatrices of another of said types.

8. A halftone electronic screening image processing apparatus comprising:
    a plurality of two different types of threshold value halftone submatrices of j×k elements arranged in a supermatrix, wherein each of said elements in the two types of submatrices is assigned different screen signal values representative of gray levels;
    means for selecting a series of threshold values in sequential order from said supermatrix;
    means for comparing the series of threshold values with an electrical signal representative of the gray level of an image pixel for generating an output marking signal corresponding to one or the other of two levels in a binary graphic or display device; and
    means for defining said halftone supermatrix such that:
    (a) when there are an odd number of elements turned ON in a supermatrix, there is one more ON element in one of said submatrix types than in the other submatrix type, and this results in a predetermined apparent screen angle at a first screen frequency, and
    (b) when there are an even number of elements turned ON in a supermatrix, there is the same number of ON elements in both submatrix types, and this results in said predetermined apparent screen angle at a second screen frequency different from said first screen frequency, whereby the electronic halftone threshold value supermatrix formed of the submatrices increases the number of available gray levels by printing the image at a higher screen frequency without increasing in false texture artifacts because the apparent screen angle does not change between gray levels.

* * * * *